April 14, 1931.  E. J. GRANT  1,800,382
AUTOMATIC STOP
Filed March 11, 1929  2 Sheets-Sheet 1

Inventor
Edwin J. Grant
By Lyon & Lyon
Attorney

April 14, 1931. E. J. GRANT 1,800,382
AUTOMATIC STOP
Filed March 11, 1929 2 Sheets-Sheet 2

Inventor
Edwin J. Grant
By Lyon & Lyon
Attorneys

Patented Apr. 14, 1931

1,800,382

UNITED STATES PATENT OFFICE

EDWIN J. GRANT, OF LOS ANGELES, CALIFORNIA

AUTOMATIC STOP

Application filed March 11, 1929. Serial No. 345,920.

This invention relates to an automatic stop for gaging the size of lumber or other materials which it is desired to saw, cut or stamp. Although the preferred embodiment of the invention described in detail hereinafter relates most particularly to the application of the automatic stop or cut-off tables and saws for use in the lumber industry, still the apparatus is capable of being advantageously used in stamping, punching, shearing or cutting machines operating not only on lumber but on various other compositions or metals.

An object of this invention is to disclose and provide a mechanism which readily, accurately and effectively gages the size or length of material to be cut, punched or sheared.

Another object of this invention is to provide a mechanism of great flexibility for gaging length of material to be cut.

Another object is to disclose and provide an automatic stop mechanism for cut-off saws and similar machines.

An object of this invention is to provide a plurality of stops in alinement and means for selectively moving said stops into operative relation with material being worked, thereby permitting the operator to more effectively work upon such material.

A still further object is to disclose and provide a stop mechanism operating electro-magnetically.

Heretofore stop devices for use with cut-off saws and the like necessitated that the operator move the piece of lumber being cut both longitudinally and transversely in order to adjust it for different lengths. For example, in cutting box shooks, it is not permissible to make a cut through a knot and the lumber is generally cut into two or more preferred lengths so as to most effectively cut the lumber and either miss the knots entirely or cut them out.

Ordinary stops are either in staggered relation or of such hinged form that they necessitate moving the lumber transversely as well as longitudinally in order to change operative contact between the lumber and the stops. Much of the operator's attention and time would be taken up in thus adjusting the lumber to fit such staggered or hinged stops which are operated by moving the lumber transversely. The operator would frequently abut the piece of lumber against a stop and then discover that the line of cut would pass through a knot with the lumber in such position. The operator would then have to lift or move the piece of lumber transversely so as to abut against another stop and then make a cut which would not pass through the knot.

These steps of adjusting lumber for the various stops, repeated for every cut made, cuts down the production of box shooks and is wasteful of time, energy and lumber. By employing the apparatus hereinafter described and embraced by my invention, an operator is permitted to change stops without transversely moving the piece of lumber being cut, but merely by moving it longitudinally.

This is accomplished by having a plurality of stops in single line, said stops being selectively put in operative position without necessitating transverse movement and guiding of the lumber being cut. By this means the operator may direct his attention to the lumber at the plane of cut and not to the stops at the end of the lumber.

Furthermore, the automatic stop mechanism embraced by my invention is operated electro-magnetically and is of simple construction.

In describing my invention reference will be had to the attached drawings which illustrate one preferred form thereof. It is to be understood that I am not to be limited to the precise details of construction or arrangement of elements shown therein, the invention being of the scope of the appended claims and including all of the modifications and changes embraced thereby. The hereinafter description will, however, refer to the appended drawings in which—

Figure 1:
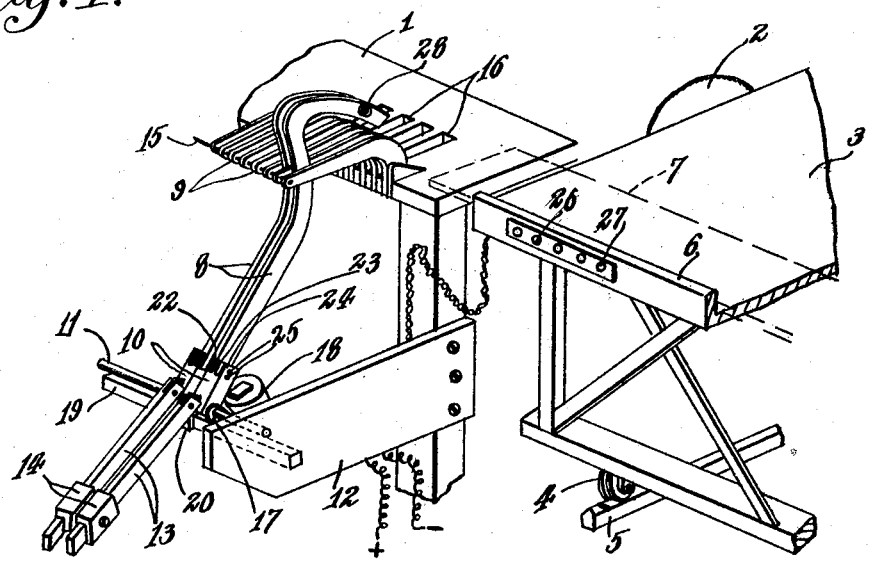
Figure 1 is a perspective view of a portion of a stop table equipped with my invention and of a cut-off saw operating therewith.

Referring now more particularly to Figure 1, which illustrates one method of employing an automatic stop mechanism embraced by my invention, the stop table 1 may be positioned adjoining a cut-off saw 2 which may be either a stationary circular saw, a swinging circular saw or a band saw. As shown in Figure 1, the saw 2 is a stationary circular saw adjoining a movable table 3 which is supported by rollers 4, or other suitable means, upon racks or guides 5 permitting the table 3 to move freely in a plane parallel to the cutting plane of the saw 2. The movable table top 3 is preferably provided with a forward guide edge 6 against which pieces of lumber 7, or other material to be cut, may be held.

The stop table 1 is preferably provided with a plurality of stops in substantial alinement with the guide edge 6 of the sawing or cutting table 4. These stops are preferably movable and means are provided for selectively positioning the stops in operative position upon the table 1. The stop table 1 may be movable toward or away from the axis of the saw 2, so as to accommodate narrow or wide lumber and obviate the necessity of moving the table 3 excessive distances when narrow lumber is to be cut.

Figure 3:
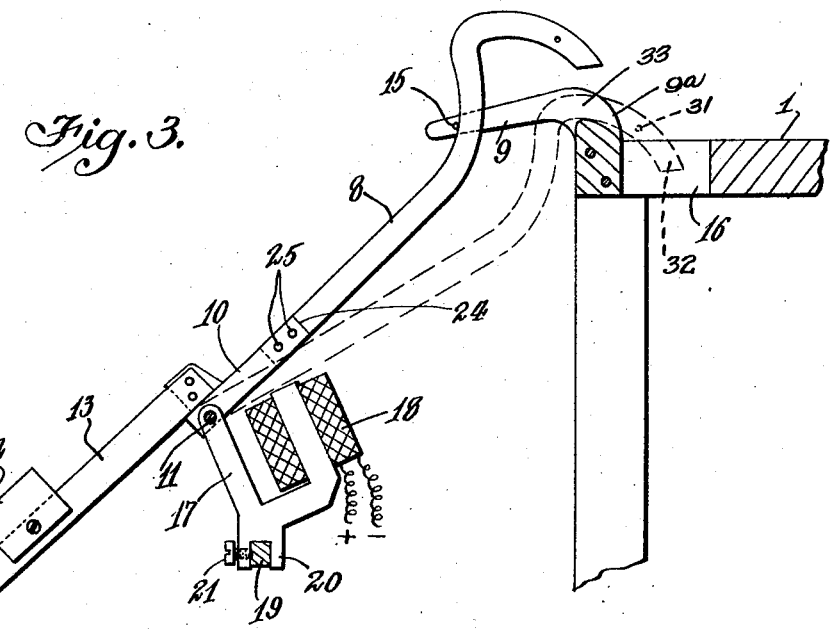
Figure 3 is a vertical section taken on the plane 3—3 of Figure 2.
Figure 4:
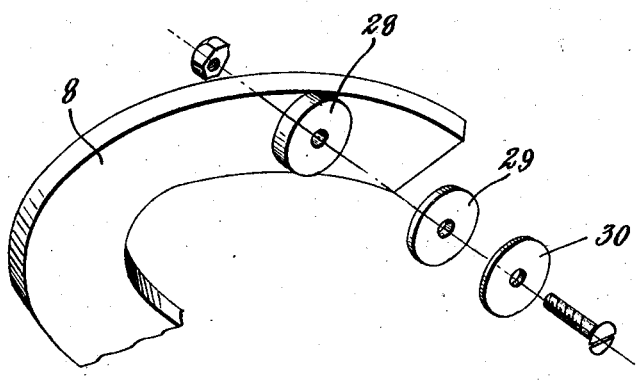
Figure 4 is a diagrammatic perspective of one of the stop elements together with additional stop which may be added thereto.

As shown in the drawing, the stop table 1 may be provided with a plurality of movable stops 8, guidingly retained in substantial alinement with the guide 6 of the adjoining saw table by means of suitable guide and bracing elements 9 projecting upwardly and rearwardly from the stop table 1. Preferably the forward edges 9a of the guiding braces 9 form a guiding surface in alinement with the forward guide edge 6 of the movable table 3. The stop arms 8 are preferably connected to metallic holders 10 which are pivoted upon a shaft 11 suitably supported from the table 1, as, for example, in a bracket 12. The shaft 11 is preferably in a plane substantially parallel to the edge or guide 6. The holders 10 may be provided with rearwardly extending lever arms 13 upon which counter weights 14 may be adjustably mounted. The counter weight 14 should be sufficient to maintain the stop arm 8 out of working position. In order to prevent the counter weights 14 from moving the stop arms 8 entirely out of contact with the guides 9 a rear stop rod 15 may be provided in the rear portion of the guides 9. In this manner the normal position assumed by the arms 8 is that shown in full lines in Figure 3.

The stop table 1 is preferably provided with a plurality of apertures 16 adapted to receive the outer end of the stop arms 8. It will be understood that the apertures 16 are in staggered relation to the guides 9 and the guides 9 and the apertures 16 are spaced from each other a standard unit of measurement, be it centimeter or linear inch.

Means for selectively moving the arms 8 into operative position within apertures 16 in the stop table 1 may be suitable mechanical means such as fluid means or they may include an electro-magnetic means, such as, for example, the preferred form shown in the drawings. A U-shaped metallic core member 17 may be provided, the core member 17 being preferably formed of laminated metal and adapted to interlock with the holder 10, also preferably formed of laminated metal, which acts as the armature. In this manner a hinged joint may be provided between the holder element 10 and one leg of the core member 17, the shaft 11 passing through the hinge so formed. A suitable coil 18 may be positioned around another leg of the core member 17. The core 17 may be supported in part and guided by a rod or shaft 19 preferably mounted in spaced relation and parallel to the shaft 11.

A suitable extension or guide 20 may be formed integrally with the core 17 or attached thereto so as to cooperate with the rod or shaft 19. In this manner the core 17, coil 18, stop arm 8 and lever arms 13 connected thereto may be moved longitudinally along the shaft 11 and guide rod 19 whenever the stop rod 15 is removed and the stop arm 8 allowed to assume a position free of the guides 9. In this manner a stop arm 8 may be moved longitudinally along the shaft 11 and assume a position co-incidental with any aperture 16 in the stop table 1. Suitable locking means may be provided to maintain the stop arm 8 and its connected elements in such desired position. For example, a set screw 21 may be provided in the guide element 20 so as to cooperate with the rod 19 and lock the stop arm 8 in suitable position along the shaft 11.

The guide members 9 are, as has been stated before, in spaced relation and the apertures 16 in table 1 are also in some definite spaced relation. For example, they are on one inch centers. Inasmuch as the coil 18 is generally of greater diameter than one inch it may be impossible to so position two stop arms 8 as to operate in adjoining apertures 16. In order to make this possible I have provided holder elements 10 with bifurcated ends, for example, provided with three end members 22, 23 and 24. This permits me to position stop arm 8 on the outer ends 22 and 24 of adjoining holder elements 10, thus allowing the stop arms 8 to freely move into adjoining apertures 16. The arms 8 may be connected to the holder elements 10 by means of suitable bolts 25 passing through apertures in the ends of the holder member 10 and the stop arms 8, or other suitable means.

The various stop arms 8 may be caused to assume operative position within apertures 16 by energizing the electro-magnets. Each coil 18 may be connected by suitable wiring to a control panel provided with units such as, for example, buttons 26, 27 and the like, preferably positioned on the forward edge of the guide 6 of the movable table 4, or some other easily accessible place, depending upon the machine with which my invention is employed.

A suitable connection is also made with a source of electrical energy. By depressing suitable control buttons 26, 27 and the like, the stop arms 8 may be selectively moved into position by selective energization of the coils 18. The stop arms 8 may be maintained in operative position within the apertures 16 as long as contact is maintained by manual depression of control buttons 26, 27 and the like, or any electrical relay system may be introduced whereby, after depressing any of said buttons, say, for example, 26, the selected stop arm will be maintained in operative position in its apertures 16 until another button controlling another stop arm is depressed. When this is done the precedingly activated stop arm will come out of operative position automatically. It is not necessary to describe in detail the electrical connections required to produce this result as such methods of control are well known in the electrical industry.

The operation of the device hereinabove described as adapted to a cut-off saw is as follows:

When, as in the manufacture of box shooks, it is desirable to cut lumber into preferred lengths of say 9, 10, 16 and 18 inches (or any other plurality of different lengths), the stop arms 8 are moved along the shaft 11 until they are positioned opposite the proper apertures 16 in the stop table 1.

Figure 2:
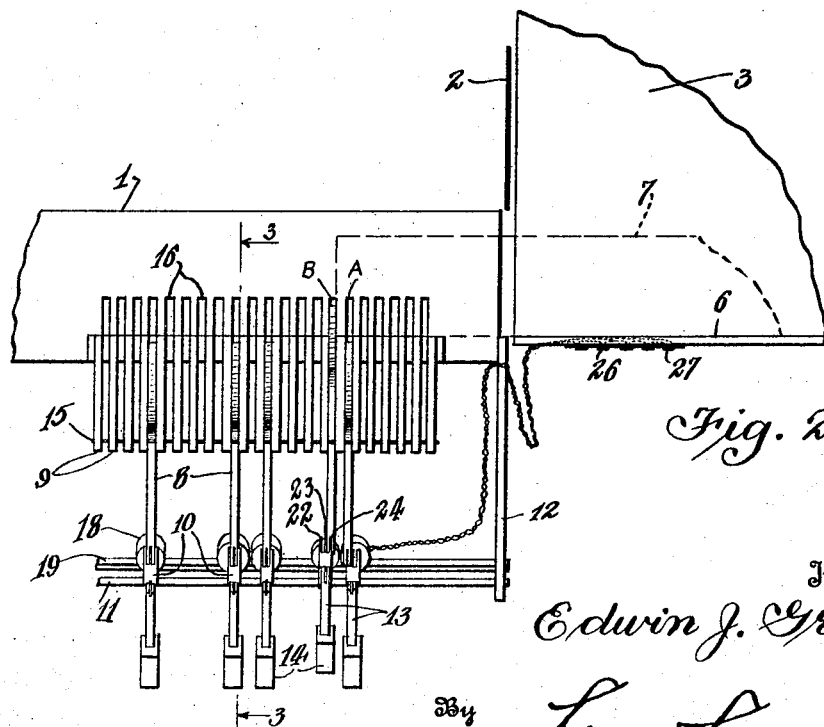
Figure 2 is a plan view of the stop table and cut-off saw shown in Figure 1.

For example, one stop arm 8 may be positioned to operate in aperture A (see Figure 2). The outer face of the stop 8, when in position in aperture A, should be a desired distance from the cutting plane of the saw 2, for example, 9 inches. The stop cooperating with aperture B may present a stop face 10 inches from the cutting plane of the saw 2. Lumber, such as, for example, the piece of lumber 7, is then moved out into the stop table 1 and the operator by depressing a proper control button, such as the button 26, mounted on the outer panel of guide edge 6, causes a desired stop arm 8 to move into an aperture 16. For example, if it is desired to cut the lumber 7 into lengths of 9 inches the operator depressed the button which causes arm 8 cooperating with aperture A to move into operative position in said aperture, and, while maintaining contact with button 26, the operator then moves the piece of lumber into abutting relation with the stop arm in position in aperture A. If a knot or other imperfection in the lumber does not appear to lie in the cutting plane he then moves the table 4, together with the piece of lumber 7 thereon, into cutting relation with the saw 2. When the stop arm 8 has been moved within the guiding braces 9 so that it assumes an operative position as indicated in dotted lines in Fig. 3, the forward end of the stop arm 8 is snugly received in the aperture 16 made in the stop table, and such stop arm presents a surface 31 against which a board to be cut may come into abutting relation. The stop arm 8 when in such operative position is braced at 32 by contact with the side of aperture 16, and is also braced at 33 by contact with the guiding brace 9. When in such operative position, therefore, a board may be moved against the stop arm, and particularly against the surface at 31 with considerable force, without dislodging the stop arm and without causing said stop arm to be bent, distorted or moved. This construction, therefore, positively positons the stop and assures the measurement of a board into a precise and exact length.

If, however, a knot, or other imperfection, occurs in the board in the line of cut of the saw 2 (after the operator has abutted the boad 7 with the stop cooperating with aperture B), he may then discontinue contact with button 26 (which activates the stop co-operating with aperture A) thereby causing the stop to swing out of working position by reason of the release of electro-magnetic force and the effect of the counter weight 14. The operator then may depress button 27 which will cause the stop arm cooperating with apertures B to come into working relation and this stop may then be utilized in the manner hereinabove described. Figure 2 shows a stop in operative position in aperture B.

It may be desirable to cut boards into pieces differing in length by only a fraction of a unit of measurement, in other words, differing in length by only a fraction of the distance between center lines of adjoining apertures 16. It is then desirable to attach spacing members, such as washers 28, 29, 30 and the like, of different thicknesses to the stop arms 8 in such position that these spacing members 28, 29 and 30 will assume a position in abutting relation with the material to be cut. The spacing members 28, 29 and 30 may be attached to the stop arm 8 by any suitable means. For example, by means of a machine screw, or nut and bolt.

The invention hereinabove described produces greatly improved results with an appreciable saving in labor. Numerous changes and modifications may be made in details of construction and in adaptation of the invention without departing from the scope of the appended claims or the spirit of the invention.

I claim:

1. A stop mechanism comprising a stop table, alined apertures in the working face of said table, fixed guiding braces extending upwardly and rearwardly from said table working face and adapted to form a longitudinal guide, said braces being slotted in rearwardly extending portions thereof to form transverse guides in alinement with said apertures, stop arms movably retained within said transverse guides, and means for moving said stop arms forwardly and downwardly in said transverse guides so as to cause said stop arms to partially enter said apertures and be retained therein irremovably against rearward pressure of lumber on said table against said stop arms.

2. A stop mechanism comprising a stop table provided with a working face, alined apertures in the working face of said table, fixed guiding braces extending upwardly and rearwardly from said table, pivoted stop arms adapted to be slidably moved in said guiding braces and partially received in said table apertures when in operative position, said arms having removably laterally projecting stop portions positioned above the working face of said table when said stop arms extend from said guiding braces into said apertures, means for selectively moving said stop arms in said guiding braces into operating position on said table and to an inoperative position above and back from the apertures in the table, whereby said removable stop portion is maintained out of contact with said guiding braces, and means for normally maintaining said stop arms out of operating position and for compensating for said removable stop portions.

3. A stop mechanism comprising a stop table provided with a working face, alined apertures in the working face of said table, fixed guiding braces extending upwardly and rearwardly from said table, pivoted stop arms adapted to be slidably moved in said guiding braces and partially received in said table apertures when in operative position, said arms having removably laterally projecting stop portions positioned above the working face of said table when said stop arms extend from said guiding braces into said apertures, means for selectively moving said stop arms in said guiding braces into operating position on said table and to an inoperative position above and back from the apertures in the table, whereby said removable stop portion is maintained out of contact with said guiding braces, means for normally maintaining said stop arms out of operating position but in sliding engagement with said guiding braces and for compensating for said removable stop portions, and means for withdrawing said stop arms from sliding engagement with said fixed braces and moving said stop arms transversely to said guiding braces.

4. A stop mechanism comprising a stop table, an aperture in the working face of said table, a fixed guiding brace extending upwardly and rearwardly from said table, and a stop arm pivoted below the plane of said table working face and adapted to be slidably moved in said guide and brace and partially enter said aperture to form a braced stop on the working face of said table between said brace and aperture and be retained therein irremovably against rearward pressure of lumber on said table against said stop arm.

5. A stop mechanism comprising a stop table, an aperture in the working face of said table, a fixed guiding brace extending upwardly and rearwardly from said table, and a stop arm pivoted below the plane of said table working face and provided with removable stop portions adapted to increase the effective width of the stop arm, said stop arm being adapted to be slidably moved in said guide and brace and partially enter said aperture to form a braced stop on the working face of said table between said brace and aperture and be retained therein irremovably against rearward pressure of lumber on said table against said stop arm.

6. A stop mechanism comprising a stop table provided with a working face, apertures in the working face of said table, fixed guiding braces extending upwardly from said table, stop arms adapted to be slidably moved in said guiding braces and be partially received in said apertures to form braced stops between said braces and apertures and be retained in said apertures irremovably against rearward pressure of lumber on said table working face against said stop arm, and means for selectively moving said stop arms upwardly and outwardly out of engagement with said table apertures or downwardly and inwardly into operative engagement with said table apertures.

7. A stop mechanism comprising a stop table provided with a working face, aligned apertures in the working face of said table, fixed guiding braces extending upwardly and rearwardly from said table, stop arms adapted to be slidably moved in said guiding braces and operatively partially received in said apertures when in operative position and be retained therein irremovably against rearward pressure of lumber on said table against said stop arms, means for normally maintaining said stop arms out of operating position, an armature of an electromagnet operatively connected to each stop arm, and an electromagnet in operable relation to said armature adapted to move said armature and stop arms in said guiding braces and partially into said apertures to form a braced stop between said brace and apertures.

Signed at Los Angeles, Calif., this 1st day of March, 1929.

EDWIN J. GRANT.